June 28, 1960
L. B. BARTH
2,942,493
AUXILIARY PEDAL ATTACHMENT
Filed June 4, 1958
2 Sheets-Sheet 1
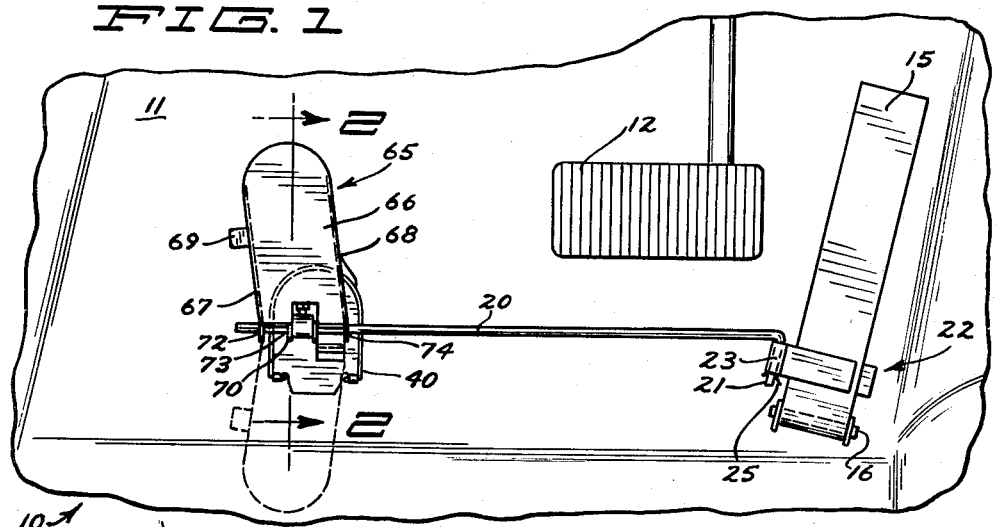
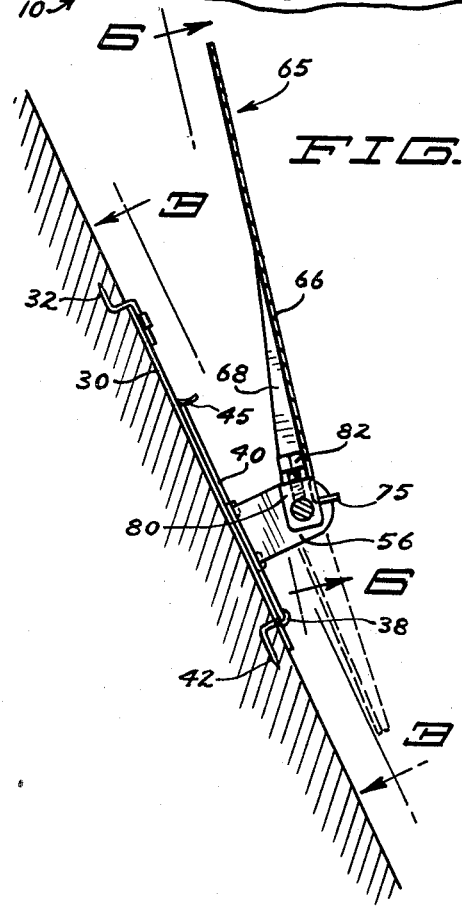
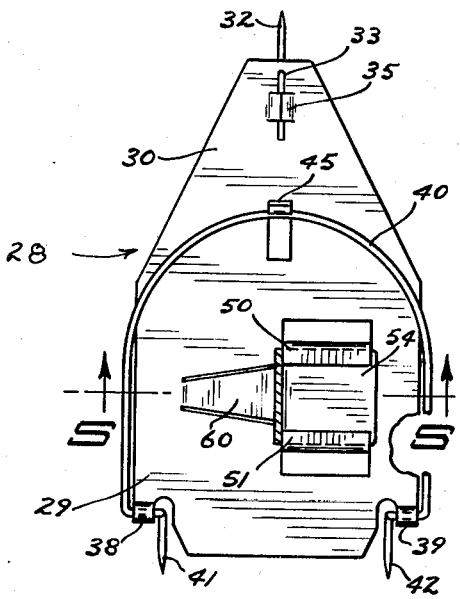
INVENTOR.
LUTHER B. BARTH
BY
ATTORNEYS

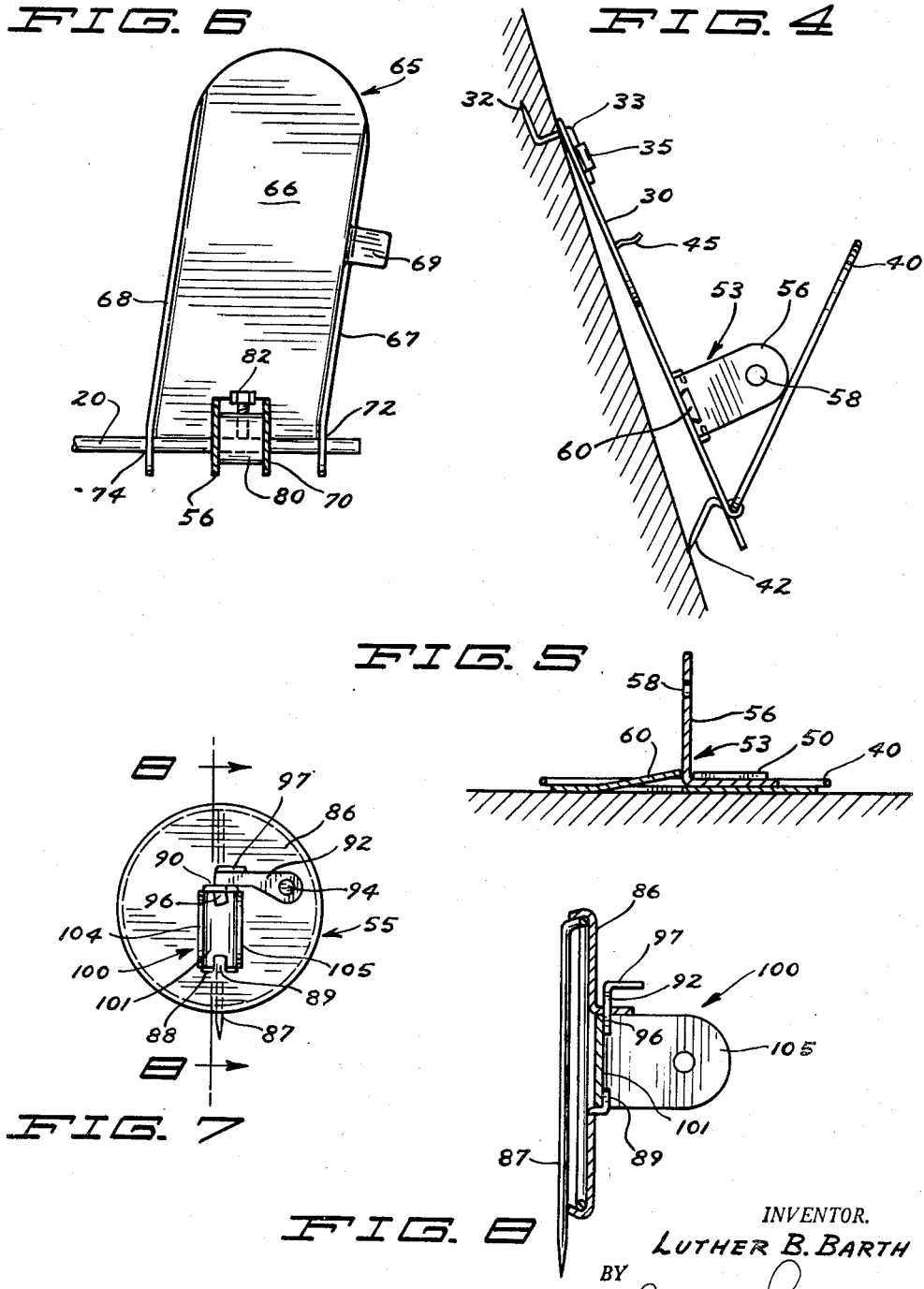

United States Patent Office 2,942,493
Patented June 28, 1960

2,942,493
AUXILIARY PEDAL ATTACHMENT
Luther B. Barth, Glen Rte., Aitkin, Minn.
Filed June 4, 1958, Ser. No. 739,893
6 Claims. (Cl. 74—562.5)

This invention relates to an auxiliary accelerator pedal. Such a pedal is intended to be used particularly in vehicles having automatic transmissions and wherein normally only the use of the right foot is required for the operation of the vehicle. When long trips are undertaken the right foot tires from constant use and the left foot tires and becomes restless from inactivity or lack of use. It is desirable to have some means therefore whereby the relative use of the right and left foot is equalized so that either foot may be used alternately as may be desired by the operator to operate the accelerator pedal.

It is also desirable to have such an auxiliary pedal attachment as above indicated which may be easily removable from a vehicle when its presence is not desired, such as in city driving. It is desirable to have such an attachment which may be quickly and easily installed when its use is desired, such as in going on a trip of some length.

It is an object of this invention therefore to provide an auxiliary pedal attachment for a motor vehicle which will permit the use of either foot of the operator to operate the accelerator pedal.

It is a further object of this invention to provide an auxiliary pedal attachment which may be quickly and easily installed in operating position in a vehicle without any tools being required for such installation.

It is a further object of this invention to provide an auxiliary pedal attachment which may easily be positioned in an inoperative position without the removal of said attachment from the vehicle and without the use of any tools.

It is a more specific object of this invention to provide an auxiliary pedal attachment for a motor vehicle having a pedal clamp adapted to be slidingly positioned onto an accelerator pedal with a rocker arm being journaled at one end in said clamp and extending across the floor of said vehicle, a plate member easily attachable to the floor pad of a motor vehicle having an upstanding portion adapted to have the other end of said rocker arm journaled therein, an auxiliary pedal pivotally mounted on said rocker arm adjacent said plate member, and means secured to said rocker arm adapted to be engaged by said auxiliary pedal when said auxiliary pedal is depressed, whereby said auxiliary pedal, rocker arm and accelerator pedal become an integral operative unit.

With reference to the previous object, it is also an object of this invention to have said auxiliary pedal freely movable pivotable rearwardly on said rocker arm so that it may be easily positioned substantially flat on the floor of the vehicle in an out of the way position.

It is also an object of this invention to provide an auxiliary pedal attachment whereby said auxiliary pedal may be spaced in certain different positions in relation to the accelerator pedal.

These and other objects and advantages of the invention will be fully set forth in the following description made in connection with the accompanying drawings in which like reference characters refer to similar parts throughout the several views and in which:

Fig. 1 is a perspective view showing applicant's device in operative position with a portion thereof in dotted line shown in an alternate position;

Fig. 2 is a view in vertical section on an enlarged scale taken on line 2—2 of Fig. 1 as indicated by the arrows;

Fig. 3 is a top plan view on an enlarged scale of a portion of applicant's device taken on line 3—3 of Fig. 2 as indicated by the arrows with a portion thereof shown in section;

Fig. 4 is a view similar to Fig. 3 on a somewhat smaller scale showing a portion thereof in a different position;

Fig. 5 is a view in vertical section on an enlarged scale taken on line 5—5 of Fig. 3 as indicated by the arrows;

Fig. 6 is a bottom plan view of a portion of applicant's device on an enlarged scale;

Fig. 7 is a top plan view on a somewhat enlarged scale showing a modification of a portion of applicant's device; and Fig. 8 is a view in partial section taken on line 8—8 of Fig. 7 as indicated by the arrows.

With reference to the drawings, and particularly to Fig. 1, a broken away portion of the floor of a motor vehicle is indicated generally by the character 10. This will represent a substantial portion of the floor of a vehicle under the dashboard and in advance of the driver's seat. A pad 11 is indicated as overlying said floor portion. Said floor pads are variously made, such as being comprised of a heavy rubber sheet material, or in some vehicles said pad may be formed as a heavy rug. A brake pedal 12 is indicated in its normal operating position. Somewhat to the right of said brake pedal 12 there is indicated an accelerator pedal 15 pivotally secured to said floor 10 by a hinge 16. Said accelerator pedal is positioned as being angled somewhat to the right as viewed in Fig. 1, and in normal inoperative position it will be at an angled relation to the floor of the vehicle. There is adequate space between said pedal and the floor of the vehicle to permit said pedal to be depressed to accelerate the motor of said vehicle.

A rocker arm 20 is indicated in Fig. 1 in operating position. Said rocker arm may be variously formed, but is indicated here as being made of a rod-like member having some transverse thickness and having substantial length. One end portion of said rocker arm 20 is angled downwardly to form a leg 21. Said leg 21 will be bent to be parallel to the adjacent side of said pedal 15 and will be in close proximity thereto.

A pedal clamp 22 is provided adapted to removably engage said pedal 15. Said clamp may be variously formed for removable engagement. It is here indicated as having its closed end portion shaped to form a journal bearing 23 for said leg 21 and having its free ends extending outwardly to form a substantially U-shaped clamp adapted to resiliently engage said pedal 15 when positioned thereon, as indicated in Fig. 1. A cotter key 25 is disposed through the lower end portion of said leg 21 to hold said leg 21 and said bearing 23 in operative engagement.

A floor gripping plate member 28 will be located adjacent the other end of said rocker arm 20. Said plate member may be variously formed, but in the embodiment of the invention here presented it is indicated as having a substantially rectangular rear end portion 29 and a front end portion 30 having inclined sides. There is no particular significance attached to the specific general form of said plate member. Various forms of fastening means may be used to secure said plate member 28 to the floor pad 11 of a motor vehicle. A downwardly forwardly extending offset pin 32 is provided at the forward end of said plate member 28. Said plate member 28 has an aperture 33 through which said pin 32 extends downwardly therethrough with the upper portion of said pin being secured to the upper surface of said plate 28 by a plate bracket 35 formed here by being punched out of said plate member 28. At the other end portion of said plate member 28 spaced bearings 38 and 39 are formed at either side thereof with said bearings being laterally spaced away from the central portion of said plate member 28. A bail 40 is provided substantially U-shaped in form and having its free end portions bent inwardly at right angles in the plane of said bail to be respectively journaled in said bearings 38 and 39. Said free end portions are then bent downwardly at right angles to the plane of said bail and again bent at right angles to extend outwardly rearwardly substantially in the plane of said bail, with said offset portions having sharpened ends and forming hooks 41 and 42. Thus it is seen that when said bail 40 is pivoted upwardly, said hooks 41 and 42 are retracted from their extended positions. A clip 45 is shown here as being pressed out of said plate 28 to be frictionally engaged by said bail 40 to securely hold said bail in operating position with said hooks 41 and 42 in extended position. Figs. 2 and 4 respectively show said hooks 41 and 42 in operating and in retracted positions. Spaced flanges 50 and 51 are here shown as being struck out of said plate member 28 and bent toward each other. A right-angled upstanding bracket 53 has a flat base portion 54 disposed between said flanges 50 and 51. Said bracket 53 has an upstanding portion 56 having an aperture 58 in said upstanding portion. A somewhat V-shaped spring member 60 is formed in said plate member 28 by having it struck from said plate member at three sides and being engaged to said plate member at its end remote from said flanges 50 and 51, as indicated in Fig. 3. Said spring member 60 will have some resilience and will be somewhat raised in normal position to engage the rear side of said upstanding bracket 53 to hold the same in locked position between said flanges 50 and 51. Said raised operating position of said spring 60 is indicated in Fig. 5. Said bracket 53 is quickly and easily removed by slightly depressing said spring 60 and sliding said bracket thereover.

Said rocker arm 20 will be disposed through said aperture 58 in the upstanding portion of said bracket 53.

Adapted to be pivotally mounted on said rocker arm 20 is an auxiliary pedal 65. Said pedal may be variously formed and is here indicated as being made of rigid sheet material having a body portion 66 having a substantially rounded forward end portion. Depending at either side of said pedal 65 are walls 67 and 68 inclined upwardly to merge with said body portion adjacent the front end portion of said pedal.

A central portion at the rear of said pedal 65 is pressed downwardly to form an intermediate depending wall 70. Said wall 70 is in a plane parallel to said walls 67 and 68. Rear portions of said pedal 65 are cut back and turned upwardly to form upstanding walls 72. With reference to Fig. 1, said walls 72 are formed in a plane parallel to the axis of said rocker arm 20 and inclined at an angle to the right of the central longitudinal axis of said pedal 65 whereby in operating position said pedal will be disposed at an angle as indicated.

The rear end portions of walls 67, 68 and 70 respectively have apertures 72, 73 and 74 therein to have said rocker arm 20 disposed therethrough. Said apertures 72, 73 and 74 respectively are in alignment centered about an axis parallel to the plane of said upstanding walls 75. A small tab 69 extends outwardly at one side of said pedal for manipulation of said pedal.

Means are provided for coordinating said pedal 65 and said rocker arm 20 into an integral operative unit when said pedal is depressed for acceleration of the motor of the vehicle. Various means may be used, but in the present embodiment of the applicant's invention a small bored locking member 80 is removably mounted on said rocker arm 20 and is movable longitudinally thereof. Said locking member 80 is here indicated as being substantially parallelepiped in form and has at one side thereof a set screw extending therethrough adapted to engage said rocker arm 20 to immovably secure said locking member and said rocker arm together into an integral unit. Said set screw is shown having a substantial sized head portion which will extend outwardly sufficiently to be substantially engaged by a portion of said pedal 65 adjacent thereto, as indicated in Fig. 2.

In operation, said plate member 28 will first be secured to the floor pad 11 in a desirable position in relation to the accelerator pedal 15. The bail 40 is raised to retract the teeth 41 and 42. The forwardly positioned tooth 32 will be securingly disposed into said pad 11. With said bail 40 in raised position, said teeth 41 and 42 will be substantially in a vertical position and will be pushed downwardly into and through said pad 11. Said bail 40 is then lowered to be locked in position by said locking member or clip 45. The downward movement of said bail 40 extends said teeth 41 and 42 outwardly of said plate member 28 to have a good gripping engagement with said pad 11.

Next said clamp 22 will be slidingly positioned onto pedal 15 and will resiliently engage the same. The rocker arm 20 will have its free end portion extending over said plate 28. Then said auxiliary pedal 65, bracket 53, and locking means 80 are mounted on said rocker arm 20. Said bracket 53 will have its upstanding portion adjacent said depending wall 70 of said pedal 65. Said locking means will be positioned adjacent said upstanding portion 56 of said bracket 53 at its side remote from said depending wall 70. Said pedal 65, bracket 53, and locking means 80 will be longitudinally positioned on said rocker arm 20 to be properly centered over said plate member 28. The base portion 54 of said bracket 53 is then moved into position to be engaged by the flanges 50 and 51. Said spring member 60 will removably hold said bracket in position. Said set screw 82 in said locking means 80 will then be tightened with said set screw in such radial position in relation to said rocker arm 20 that when said pedal 65 is moved forwardly and downwardly it will be engaged by said set screw while in a suitable elevated position. Further movement forward from this point will cause said pedal to rotate said rocker arm 20 and at the same time move said accelerator pedal 15 forwardly into operating position.

When the operator does not desire to use said auxiliary pedal 65, as for city driving, he may engage said tab 69 with the edge of his shoe and flip said pedal 65 rearwardly so that it will rest in an out of the way position in a substantially flat position on said floor 10.

To remove applicant's device altogether, all that is necessary is that said spring 60 be depressed and said bracket 53 slid to the left, with reference to Fig. 1, out of and away from said flanges 50 and 51. At the same time said clamp 22 will slidingly move to the left out of engagement with said pedal 15. This portion of applicant's device is then removed as a unit. Said plate member 28 may be left in position on the floor of the motor vehicle or it may be very quickly and easily removed simply by raising the bail 40, whereupon the teeth 32, 41 and 42 of said plate member 28 will be easily disengaged from said pad 11.

A modified plate member 85 is shown in Figs. 7 and 8. Said plate member 85 is very simply constructed comprising a circular body portion 86 of rigid sheet material somewhat concave in vertical section to have a shallow recess formed thereunder. A fastening means 87, here indicated as being a straight pin of a somewhat resilient character, is secured to the underside of said body portion 86 adjacent the periphery thereof. A substantially rectangular opening 88 is present in the central portion of said plate member having an inwardly extending ear 89 at one end thereof. A wall 90 of short height is formed at the other end of said opening with an aperture through said wall adjacent the surface of said body portion 86. An arm 92 is pivoted by a rivet 94 to said body portion 86 and has an ear 96 formed at its free end adapted to be disposed through said apertured wall to extend inwardly of said opening 88. Said arm 92 has an upstanding portion 97 forming a tab by which it can be readily moved.

An upstanding bracket 100 is adapted to be removably secured onto said plate 85 having a base portion 101 to be disposed in said opening 88 and engaged by said ears 89 and 96. Said bracket has upstanding spaced walls 105 and 106 similar in form to said wall 56 and apertured at their upper end portions to have said rocker arm 20 disposed therethrough.

In operation, said plate 85 will be substituted for said plate 28 and in all other respects applicant's device is operated in the same manner.

Thus it is seen that I have provided a very simply constructed, easily installed, and easily removed auxiliary pedal attachment. Said pedal attachment is adapted to be positioned in an out of the way place when its use is not desired and when it is not desired to remove the same entirely. Applicant's device is adapted for easy positioning to accommodate any certain operator and has proved to be very successful in actual operation.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. An auxiliary accelerator pedal attachment for automotive vehicles having a primary accelerator pedal pivotally mounted on the floor of a vehicle and extending upwardly therefrom at an angle to said floor and a flexible pad on said floor having in combination, a rocker arm extending substantially across the floor of said vehicle, a leg formed at one end of said rocker arm, a U-shaped accelerator pedal clamp adapted to be slidingly disposed over said pedal and forming a journal bearing for said leg, a bracket having a hand operable retractable gripping means adapted to be removably secured to said floor pad of said vehicle, said rocker arm having its other end slidably journaled in said bracket, an auxiliary pedal removably pivotally attached to said other end of said rocker arm, a locking means secured on said rocker arm, said locking means adapted to be operatively engaged by said auxiliary pedal when said pedal is moved forwardly to rotate said rocker arm and depress said first mentioned pedal whereby said auxiliary pedal becomes operationally integral with said rocker arm and said first mentioned pedal and said auxiliary pedal is freely movable alone rearwardly on said rocker arm to be positioned in a substantially flat position on the floor of said vehicle to be out of the way of the operator thereof.

2. The structure set forth in claim 1, said bracket comprising a substantially flat plate member having a plurality of floor pad gripping teeth carried thereby, means for retracting and extending certain of said teeth to removably anchor said bracket in said floor pad of said vehicle.

3. The structure set forth in claim 1, said bracket having a pair of spaced facing flanges thereon struck therefrom and reversely bent in directions toward one another, an upstanding right-angled bracket having a base portion slidable between said flanges, a flat spring struck from said first bracket having a somewhat raised free end adjacent the ends at one side of said flanges for removably holding said second bracket in operating position, said upstanding portion of said second bracket being apertured to form a bearing for said rocker arm.

4. The structure set forth in claim 1, said auxiliary pedal having spaced apertured depending ears for receiving said rocker arm therethrough, and inclined walls at either side of said pedal formed by forwardly extending edge portions of said ears to form a central recess in the rear portion of said pedal to accommodate said second mentioned bracket and said locking means.

5. An auxiliary accelerator pedal attachment for automotive vehicles having a primary accelerator pedal pivotally mounted on the floor of a vehicle and extending upwardly therefrom at an angle to said floor and a flexible pad on said floor having in combination, a rocker arm extending substantially across the floor of said vehicle, a leg formed at one end of said rocker arm adjacent said pedal of said vehicle and extending at an angle to be parallel to the adjacent side of said pedal, a U-shaped pedal clamp pivoted to said leg and adapted to be slidingly disposed onto said pedal above the pivot connection of said pedal to the floor of said vehicle, a substantially flat floor pad gripping plate member adjacent the other end of said rocker arm, said plate member having a plurality of floor pad gripping teeth carried thereby, a bail member pivoted to said plate member having certain of said teeth integral therewith whereby said teeth are retractable and extendable to be removably disposed in said floor pad, a pair of flanges struck from said plate member to form a channel and a third flange at right angles thereto to form a locking member, a bracket removably secured by said flanges and having an upstanding apertured portion forming a bearing to receive therethrough said other end portion of said rocker arm, an auxiliary pedal having apertured spaced depending ears at the rear end portion thereof adapted to have said rocker arm extend therethrough for positioning said auxiliary pedal on said rocker arm, said upstanding portion of said bracket being positioned on said rocker arm adjacent said auxiliary pedal, a locking member secured on said rocker arm in operative relationship to said pedal to be engaged by said pedal when said pedal is depressed forwardly, whereby when said auxiliary pedal is depressed said rocker arm is rotated therewith and said first mentioned pedal is accordingly depressed to accelerate the engine of said vehicle, and said auxiliary pedal is freely pivotable rearwardly alone to lie in a substantially flat position on the floor of said vehicle out of the way of said operator of said vehicle.

6. An auxiliary accelerator pedal attachment for automotive vehicles having a primary accelerator pedal pivotally mounted on the floor of a vehicle and extending upwardly therefrom at an angle to said floor and a flexible pad on said floor having in combination, a rocker arm extending substantially across the floor of said vehicle, a leg formed at one end of said rocker arm adjacent said pedal of said vehicle and extending at an angle to be parallel to the adjacent side of said pedal, a U-shaped pedal clamp pivoted to said leg and adapted to be slidingly disposed onto said pedal above the pivot connection of said pedal to the floor of said vehicle, a substantially flat floor pad gripping plate member adjacent the other end of said rocker arm, said plate member comprising an open-ended pin disposed therebeneath adapted to be removably secured in said floor pad, a bracket on said plate having an apertured upstanding portion, said bracket having a substantially flat base portion, a pair of ears carried by said plate for engaging said base portion, one of said ears being pivotally retractable for easy disengagement of said bracket from said plate member, an auxiliary pedal having apertured spaced depending ears at the rear end portion thereof adapted to have said rocker arm extend therethrough for positioning said auxiliary pedal on said rocker arm, said upstanding portion of said bracket being positioned on said rocker arm adjacent said auxiliary pedal, a locking member secured on said rocker arm in operative relationship to said pedal when said pedal is depressed forwardly, whereby when said auxiliary pedal is depressed said rocker arm is rotated therewith and said first mentioned pedal is accordingly depressed to accelerate the engine of said vehicle, and said auxiliary pedal is freely pivotable rearwardly alone to lie in a substantially flat position on the floor of said vehicle out of the way of said operator of said vehicle.

References Cited in the file of this patent

UNITED STATES PATENTS

| | | |
|---|---|---|
| Re. 19,262 | Brandt | Aug. 7, 1934 |
| 1,733,854 | Bailey | Oct. 29, 1929 |
| 2,658,411 | Eversman | Nov. 10, 1953 |
| 2,735,312 | Howard | Feb. 21, 1956 |
| 2,764,037 | Venditty | Sept. 25, 1956 |